March 8, 1960

P. S. MARTIN 2,927,837

TRAFFIC MONITORING SYSTEMS

Filed Jan. 11, 1955

INVENTOR
Paul S. Martin

March 8, 1960 P. S. MARTIN 2,927,837
TRAFFIC MONITORING SYSTEMS
Filed Jan. 11, 1955 3 Sheets-Sheet 2

FIG. 3

INVENTOR
Paul S. Martin

United States Patent Office 2,927,837
Patented Mar. 8, 1960

2,927,837

TRAFFIC MONITORING SYSTEMS

Paul S. Martin, Flushing, N.Y.

Application January 11, 1955, Serial No. 481,225

28 Claims. (Cl. 346—107)

The present invention relates to systems of monitoring the speed of vehicles along traffic ways. In particular this invention relates to the automatic control of a camera to record the images of vehicles which exceed a set speed limit.

It has for long been proposed to use a camera in conjunction with a speed detector for photographing speeding cars. The difficulty exists of ascertaining for certainty that the car which appeared in the photograph actually was the car which was responsible for the excess-speed measurement. An object of the present invention is to provide a control system for a camera which will both evaluate the speed of the vehicle and will, of a certainty, photograph the vehicle whose speed was determined to be excessive, without possibility of confusion resulting from closely adjacent vehicles.

In the practical use of such vehicle identification photographs, it becomes important to register the rear of the vehicles, since an identifying license plate is uniformly carried at the rear of vehicles. It might be a simple matter to direct the camera at the place where the vehicles would be expected to have their rears at the time that the front of each vehicle completely traverses the measurement region. The fact that many vehicles differ in length introduces a special problem. A further object of the invention accordingly is to adapt a vehicle detector and camera system so as to photograph the rear of vehicles of different lengths. A further object is to produce camera operation when a vehicle rear is in the camera field, but only upon determination that the vehicle is in fact a speeder.

A further object of the invention is to adapt a suitable speed detection and automatically controlled camera to function for multiple traffic lanes without ambiguity as to the vehicle whose speed was measured and whose image was recorded despite the possibility that multiple vehicles may upon occasion appear in multiple lanes in single photographs. A related object is to adapt a single camera and speed detector to serve for multiple lanes of traffic in the same direction.

Various specific embodiments of the invention are described in detail below, and in common they achieve certain important results. One feature is the result of a special arrangement of vehicle detector elements. A pair of vehicle detectors is disposed in alignment across a roadway, and they are connected to be responsive only when activated concurrently. This coincidence is made necessary for operation of the equipment in one aspect of the invention. It follows that a vehicle that activated both detector elements so located must of necessity be in a certain traffic lane. Now if a second pair of detector elements is disposed at a point further along the road but close to the first pair and in alignment across the road, it follows that a vehicle which activated the first pair and which also activates the second pair must be in a specific measurement zone, uniquely.

The pairs of detector elements aligned across the roadway in the embodiments disclosed are pressure sensitive devices which are actuated by the wheels of a vehicle. It may be established that three feet or some such short distance is less than the spacing between any pair of front-to-rear separated pairs of wheels of vehicles to be monitored. In an arrangement of a pair of aligned simultaneously effective wheel-responsive detector elements within a short distance from another pair of detector elements aligned across the roadway, there is no possibility that a vehicle which is passing the measurement zone could have its speed measurement disturbed by another vehicle traveling alongside it or immediately in front of it or immediately behind it. Consequently the speed determination resulting from the detector elements disposed in this fashion is completely unambiguous, and correspondingly a photograph of such a vehicle identified with that zone is necessarily a picture of the vehicle whose speed was measured. A photograph of a vehicle whose speed was thus ascertained is completely unambiguous, even though the photograph was made automatically, with no observer.

The license plates which identify vehicles are supported at the rear of the vehicles and therefore a photograph which is to evidence and identify excessive speeds of vehicles must include a clear image of the rear of such vehicles. This is accomplished, in each of the embodiments of the invention detailed below, by suppressing camera operation for a critical period of time where the period of time measurement is re-started in response to detection of additional, following wheels of the vehicle to be photographed. The period may be adjusted in relation to the speeds to be monitored, and in accordance with the maximum axle separation of the vehicles that are to be photographed. After two or more pairs of wheels have passed the wheel detectors, and after a time elapses corresponding to the speed for which the equipment is set and the greatest axle separation to be considered, the camera is actuated. In this way the rears of vehicles can be reliably framed in the field of the camera, despite different lengths of vehicles to be taken into account. There will naturally be some latitude of variation in the sizes of the images thus produced, for a vehicle which is traveling just slightly above the set limit of the apparatus will be quite large in the field of the camera whereas, after the same time delay, a vehicle traveling at much higher speed will have traveled a greater distance from the camera and will have a somewhat smaller image; but when the quantities encountered in practice are taken into consideration, this variation in size of image is entirely acceptable. Moreover, the delay time can be reduced as a function of higher speeds, to minimize this effect.

The delay circuit cooperates with the speed measurement circuit in such a way that neither can actuate the camera by itself. The camera is controlled so as never to operate unless a vehicle traveling at excessive speed is detected; and when this occurs the camera actuation is delayed as described. Circuits combining these two functions take various forms, as will be seen.

Two of the embodiments detailed below illustrate how a single speed detector and camera combination can be utilized to identify a speeding vehicle that may travel in any one of multiple lanes, despite the possible presence of multiple vehicles in some photographs. This is achieved in the two embodiments by employing detectors that are effective in the respective lanes and utilizing those detectors to suppress detection of vehicles in the other lane or lanes once a speed measurement cycle has been initiated. Once a speeder has been detected in one lane, not only does the camera register the image of that vehicle, after an appropriate delay if the delay feature is utilized, but it also records a symbol indicating which of the lanes was in control of the speed measurement operation that resulted in the taking of that particular photograph. Where the delay system is used, it is useful in accomplishing the further purpose of maintaining the disabling condition during the speed measurement time interval. This precludes the possibility of responses from multiple vehicles producing confused control impulses to the speed detector.

Various aspects of the invention will become clearer, and further objects and features will be better appreciated, from the following detailed description of the several embodiments of the invention shown in the accompanying drawings. In these drawings.

Figure 1:
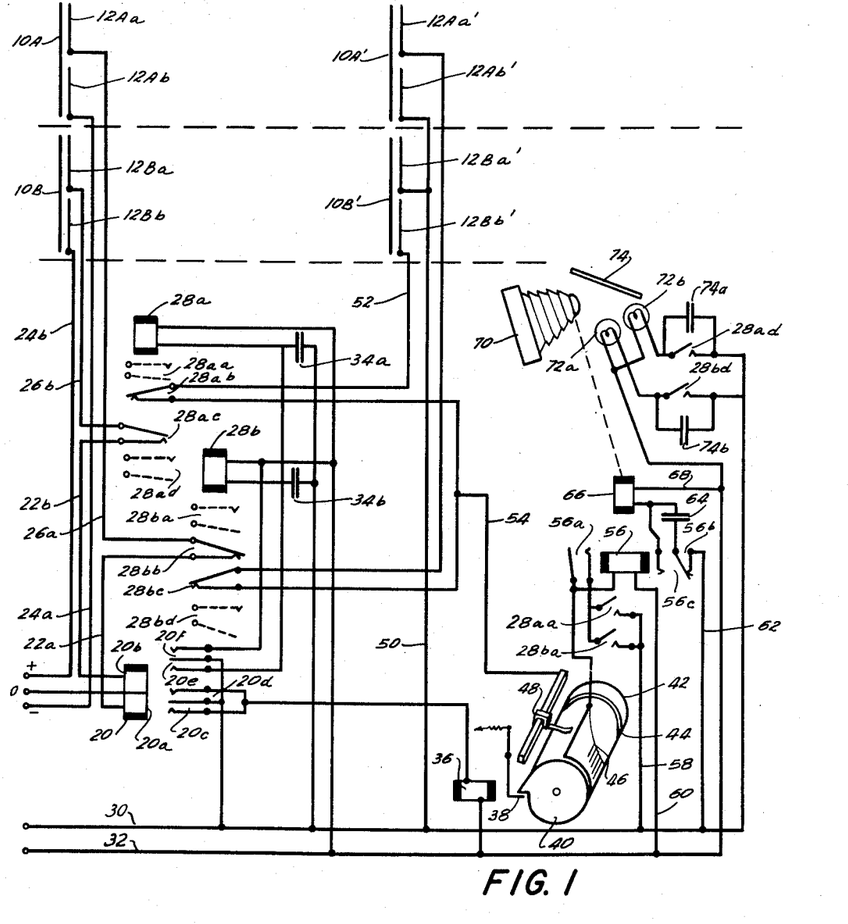
Figure 1 is the wiring diagram of an embodiment of the invention.

Referring now to Figure 1, there are shown a pair of vehicle detectors, each of which is made in segmental form. Element 10A of one detector is a conductor extending all the way across one lane in close proximity to a pair of aligned conductor segments 12A$a$ and 12A$b$. Conductor 10B extends all the way across the other traffic lane and is in close proximity to a pair of conductor segments 12B$a$ and 12B$b$. Each of these detectors 10A—12A$a$—12A$b$ and 10B—12B$a$—12B$b$ may be considered a pair of wheel-responsive detector elements disposed in alignment across a traffic lane; and two such segmental wheel-responsive detectors are illustrated across the two lanes represented by broken horizontal lines at the top of the figure.

A second complement of wheel-responsive detectors is disposed further down the same two traffic lanes. One pair of segmental detectors 10A'—12A$a$'—12A$b$' is disposed in the same traffic lane as the 10A—12A$a$—12A$b$ detector unit, while the second traffic lane contains a second segmental detector 10B'—12B$a$'—12B$b$' in alignment with detector 10A'—12A$a$'—12A$b$' and in the same traffic lane as detector unit 10B—12B$a$—12B$b$.

Figure 2:
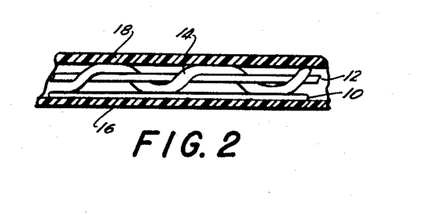
Figure 2 is an enlarged fragmentary cross-section of a wheel-responsive detector element forming a portion of the system in Figure 1.

These detector elements are pressure sensitive by virtue of the construction used. It is acknowledged that no novelty resides in this pressure-sensitive construction, but a brief explanation will be given for better understanding of the operation of the illustrative detectors. Each segmental element of the detector described includes a flat metal spring 10 above which is disposed a further flat metal spring 12, these being normally spaced from each other by a strand 14 of resilient insulation such as rubber or a synthetic rubber. This assembly is enclosed in a waterproof rubber sheath 18. Suitable connections are made to elements 10 and 12 so that the controlled circuits may be effectively connected to the segmental conductors, this detail being omitted from Figure 2.

In Figure 1, segmental conductor 12A$a$ of such a pressure-sensitive element is connected to one-half 20$a$ of a polarized relay 20 via wire 26$a$, contacts 28$bb$ of a relay to be described, and wire 22$a$. The associated segmental conductor 12A$b$ is connected by wire 24$a$ to the negative terminal of a direct-current supply. Relay section 20 is connected to the zero potential point of the direct current supply. Similarly, segmental conductor 12B$a$ is connected, through wire 26$b$ and relay contacts 28$ac$ (to be described) by way of wire 22$b$ to a second section 20$b$ of polarized relay 20. Segmental conductor 12B$b$ is connected by wire 24$b$ to the positive terminal of the direct current supply.

It may be considered that a vehicle is traveling from left to right along the upper traffic lane of Figure 1. When the first pair of wheels reaches the first pair of aligned segmental detectors, conductor 12A$a$ is pressed against conductor 10A, and conductor 12A$b$ is pressed against the same conductor 10A, so that a circuit is completed from the minus potential point through wire 24$a$, conductor 12A$b$, conductor 10A, segmental conductor 12A$a$, wire 26$a$, relay contacts 28$bb$, and the section 20$a$ of polarized relay 20, to the zero potential point of the direct current supply. The result of this is to energize one-half of the polarized relay and to pull down a pair of contacts, closing contacts 20$c$ and 20$e$ of the polarized relay.

If the segmental conductors 12B$a$ and 12B$b$ had been simultaneously pressed by a pair of wheels of a vehicle, then the upper section 20$b$ of the polarized relay 20 would have been energized, and polarized relay contacts 20$b$ and 20$f$ would have been closed instead. As will be seen, relay 20 has the dual functions of starting an elapsed time measurement device, and of suppressing operation of the detector elements in the lane other than the one where the tapes were actuated.

Closing of contacts 20$e$ as previously described has the effect of connecting power line 30 through the relay contact 20$e$ to a relay 28$a$ and to the opposite power line 32. This energization of relay 28$a$ has the effect of opening the contacts 28$ab$ so as to disable the detector elements in the "B" traffic lane without disturbing the detector elements in the "A" traffic lane. Contacts 28$ab$ are also opened, and these disable the detector elements associated with conductor 10B', thereby disabling the second detector elements in the "B" traffic lane.

If polarized relay section 20$b$ had been energized and contact 20$f$ closed, relay 28$b$ would have been energized, thereby opening contacts 28$bb$ and 28$bc$ so as to disable all of the detector elements in the "A" traffic lane without disturbing the detector elements in the "B" traffic lane.

Associated with each relay 28$a$ and 28$b$ is a condenser 34$a$ and 34$b$ which is connected across a pair of contacts 20$f$ and 20$e$. When these contacts are closed, the condensers are discharged. When the momentary energization of polarized relay 20 is ended by passage of the wheel beyond the detector elements in the roadway, and the contact 20$f$ or 20$e$ is again opened, the energization of relay 28$a$ or 28$b$ is nonetheless sustained for a short interval by the charging current of the respective condenser 34$a$ and 34$b$. The time during which one of these condensers should maintain its associated relay energized is determined in a manner to be described, but it will be clear that a vehicle which reaches the first detector in the "A" or the "B" lane will find the next detector in its lane in condition for response by virtue of the operation of the associated relay 28$a$ or 28$b$, and at the same time the detectors in the other lane will be ineffectual.

Polarized relay contacts 20$c$ and 20$d$ are both connected to power line 30, and to one terminal of a solenoid 36, the other terminal of which is connected to line 32. This solenoid controls an elapsed time measuring device including a latch 38 which is spring biased into latching engagement with a detent extending from a drum 40. This drum is operated by a symbolically represented constant-speed motor 42 and through friction discs 44. The drum carries a shaped conductive element 46 which has a long axial dimension at one azimuthal position and a progressively shorter axial dimension on the way around the drum. An axially adjustable contact 48 is normally out of contact with conductor element 46. It may be adjusted axially so as to cooperate with element 46 upon rotation of the drum for varying lengths of time. When solenoid 36 is energized, contact 48 almost immediately moves into engagement with conductor element 46 and remains in engagement for a period of time which depends upon the axial position of element 48.

A circuit may be traced from wire 30, along wire 50, to sequential conductor 12A$b$' or 12B$a$', through either conductor 10B' or 10A', to the segmental conductor 12Bb' or 12Aa' and through one of the relay contacts 28ab or 28bc and through wire 54 to contact 48, through conductor 46 on the drum, and through a pair of relay contacts 56a (to be described), through relay 56, to the line 32. This circuit is completed, and consequently relay 56 is energized, only if the drum has not rotated so far that contact 48 in a particular adjustment is out of the conductice area of conductor 46 on the drum. The circuit described is completed therefore only if the vehicle which activated the first pair of segmental detectors in one of the traffic lanes reaches the second pair of segmental detectors in that traffic lane during the time interval after latch 38 releases drum 40 and while contact 48 is still in engagement with conductor 46 on the drum. This condition evidences travel of the vehicle between the first and the second detector in its traffic lane in too short a time interval, that is, at excessive speed. Contact 46 would no longer be in engagement with conductor 46 if the travel time of the vehicle from the first detector to the second detector were below the speed limit for which contact 48 is adjusted.

When relay 56 is energized in a manner to evidence detection of a speeder, three sets of contacts are operated. Holding contacts 56a are closed, contacts 56b are opened, and contacts 56c are closed. Holding contacts 56a maintain relay 56 energized despite the fact that the circuit through contact 48 and conductor 46 may be broken almost immediately after it effects the energization of relay 56. Relay 56 remains energized, therefore, by a circuit from line 30 through wire 58, through one of the contacts 28aa or 28ba, through the holding contacts 56a to relay 56 and thence by wire 60 to line 32. (Contacts 28aa and 28ba are shown in dotted lines at the left of Fig. 1 to represent their physical association with the other contacts and operating coils constituting relays 28a and 28b, and these same contacts are shown in solid lines at the lower right of Fig. 1 in their positions in the electrical circuit. The same drawing representation is used for contacts 28ad and 28bd mentioned below.) Contacts 28aa or 28ba remain closed, relay 56 remains energized and the holding contacts stay closed, so long as one of the condensers 34a or 34b maintains relay 28a or 28b energized. This is sustained not only after a wheel has left the first detector and after the wheel has left the second detector. Each time another wheel reaches one of those detectors, the charge on the condenser 34a or 34b is dissipated by short circuiting contacts of the polarized relay, and the relay 28a or 28b is then energized for a renewed delay interval during which condenser 34a or 34b draws its charging current through one of the condensers. It is during this interval that relay 56 remains energized.

Relay 56 controls operation of camera 70 in a manner to be described. It will be observed that this relay 56 in its control relation over the camera is not effective at all unless the speed measurement has been effected, with the aid of interval timer 46—48—36—38 and the associated detector system, and unless a determination has been made that a speeder has t raversed the distance in one traffic lane from the first to the second detector in less than a permissible time interval. Even then, this relay 56 does not cause camera actuation, until after elapse of the time-delay interval determined by the condensers 34a, 34b and the relays 28a, 28b. To operate the camera, it is not enough that the condensers are still discharging at sufficient current rate to maintain energization of relay 28a or 28b. There must also be the determination that a speeder has traversed a traffic lane at an excessive rate.

Relay 56 upon energization closes contacts 56c so as to short-circuit a condenser 64. One terminal of condenser 64 goes to relay contacts 56b and the other terminal goes to a camera-operating solenoid 66. The short-circuiting of condenser 64 has naturally no effect on solenoid 56 at the moment. When the time interval of the delay system as previously described elapses, relay 56 is deenergized and contacts 56b close again. Wire 62 is then connected through relay contacts 56b, condenser 64, solenoid 66, and wire 68 to line 32. The charging current of condenser 64 in this circuit is sufficient to energize solenoid 66 and thus operate camera 70. This operation of the camera occurs after a time delay which is computed so that the longest vehicles which are contemplated to travel along that roadway will reach the field of the camera. Thus if the actual lengthwise separation of the wheels of a pleasure car is seven feet and the actual separation of the wheels of a truck is perhaps ten or twelve feet, and the actual lengthwise separation between the rear wheels of the tractor unit and the rear wheels of a trailer hauled by the tractor is, perhaps, twenty feet, and if the speed setting of the apparatus is for sixty miles an hour, then the delay time during which relay 28a or 28b is to remain energized by its associated condenser is computed on the basis of the twenty foot maximum separation and the sixty-mile-per-hour speed setting. For sixty miles an hour and twenty feet, the time delay would be approximately $\frac{2}{9}$ of a second. This is accomplished by using an appropriate size of condenser 34a or 34b in relation to the impedance of relay 28a or 28b, and the speed setting of contact 48 is adjusted to correspond. The result is that pleasure cars as well as trailer trucks will have their rears approximately twenty feet away from the second set of wheel detectors at 60 miles per hour. This twenty foot distance is reduced somewhat by the overhang of the vehicle behind the rear axle. At eighty or ninety miles an hour the distance of this vehicle rear from the camera would be increased to perhaps thirty feet, giving a total range of distances of ten feet. This is of comparatively little significance if a camera with the proper lens complement is chosen.

The delay system has the practical advantage that the installation of the vehicle detecting elements in the roadway and the location of the camera will be very close to each other, for the vehicles will have traveled twenty to thirty feet beyond the second detector when the photograph is taken and the camera range reasonably is twenty to thirty feet. If the camera were to be disposed in such position as to photograph the rears of vehicles just having their front wheels on the detector elements, then the camera would necessarily be disposed many feet to the rear of the vehicle detectors in the roadway. Moreover, vehicles of different lengths would have widely different image sizes in such installation.

It may happen that one pleasure car is following another so close as to simulate a single truck or trailer truck. This is most unusual at the high speeds that are contemplated; but if it should happen it nevertheless does not defeat the operation of the system. The second vehicle (which necessarily is traveling as fast as the first vehicle) is the one of the two which would be photographed. The first would escape but no harm would be done in charging only the second driver with speed-law violation in such use of the equipment.

Figures 4, 5:
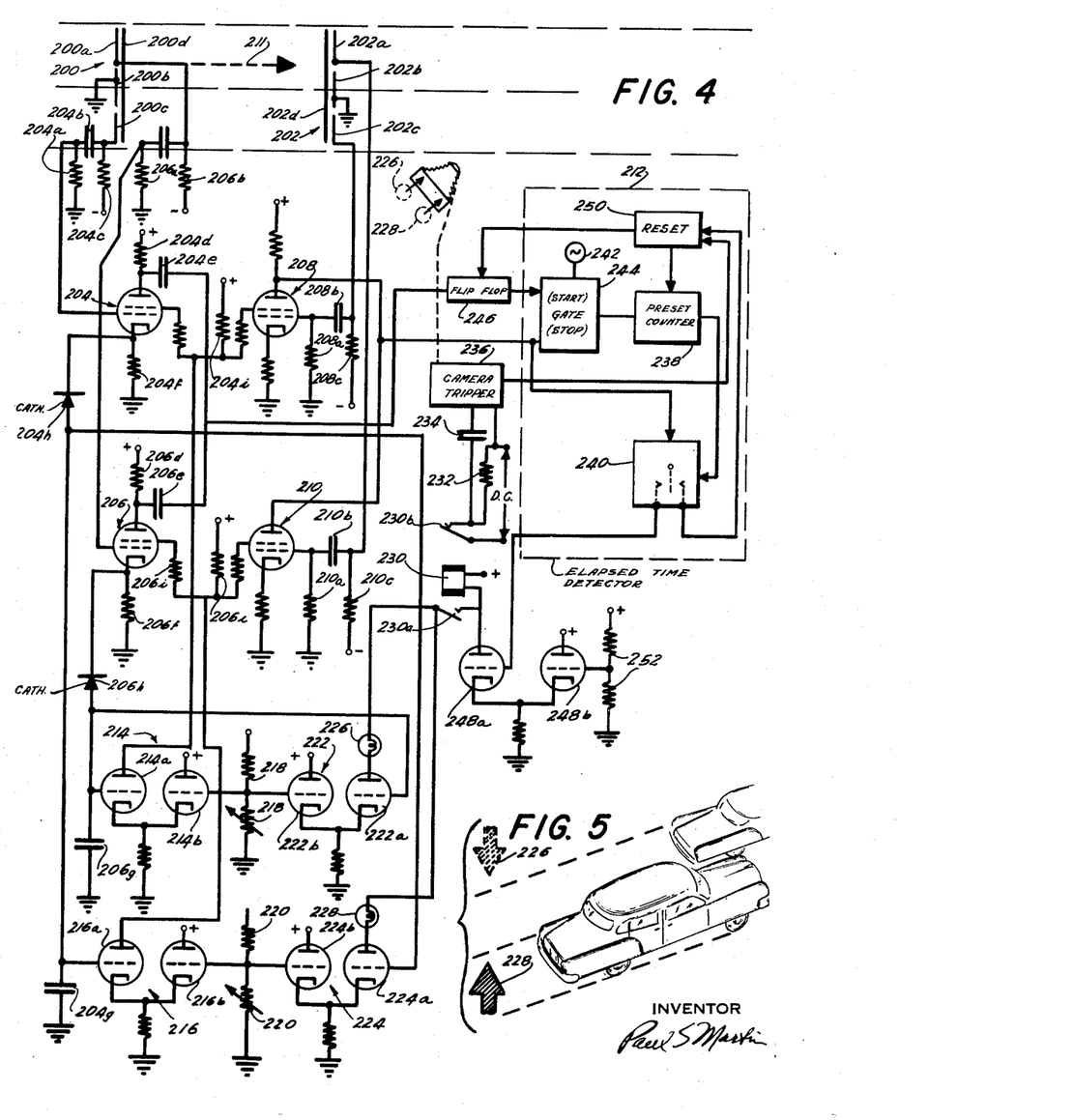
Figure 5 is a typical image resulting from operation of the apparatus of Figure 4.

A pair of lamps 72a and 72b are provided in association with a semi-transparent mirror 74 which projects the images of the lamps on the film where the vehicle image is recorded. One or the other lamp is effective for any speed measurement operation. One or the other of these lamps is lit through a set of contacts 28ad or 28bd operated by relay 28a or 28b which is associated with the detectors of one traffic lane or the other. During the time of closure of these contacts 28ab or 28bb, the camera shutter is closed and light from the lamps does not reach the film. However when relay 28a or 28b is deenergized and the camera shutter is operated by solenoid 66, the lamp 72a or 72b remains on for a brief time interval, by virtue of a condenser 74a or 74b which draws charging current for a time after contact opening. By virtue of these lamps and the circuit thus described, the particular lane which is in control of the speed measurement is designated by an image of one or the other of the lamps 72a or 72b, somewhat as shown in Figure 5.

Figure 3:
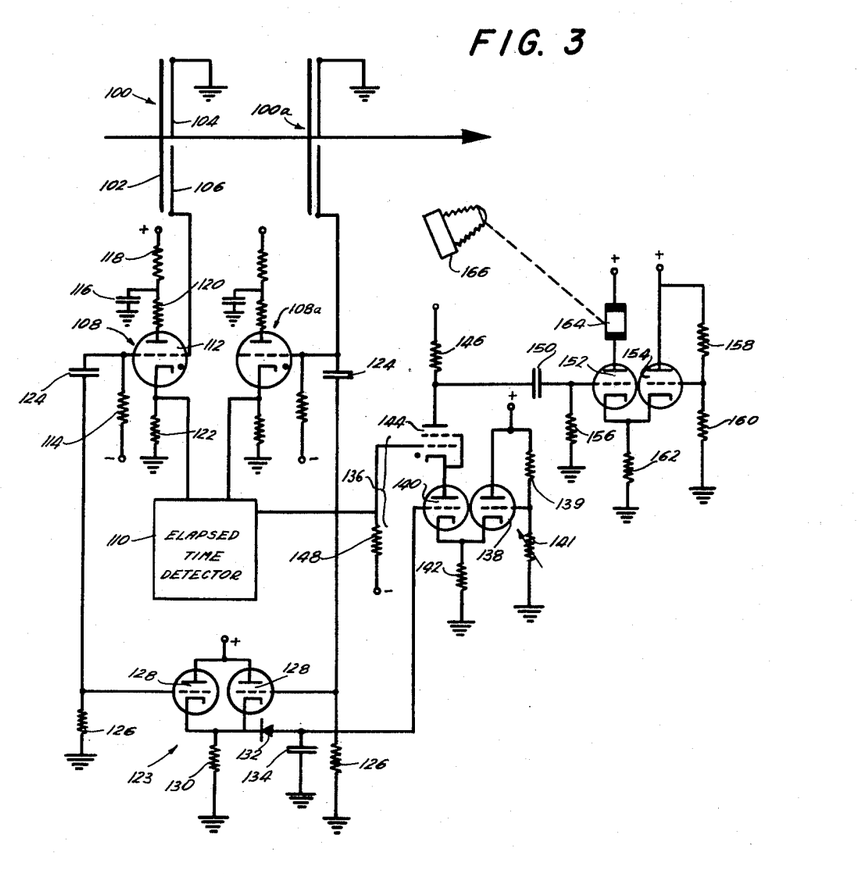
Figures 3 and 4 are wiring diagrams of two other embodiments of the invention, each incorporating certain unique aspects of the invention not found in the other figures.

Figure 3 shows a single-lane electronic control system for controlling a camera directed at the rear of each vehicle emerging from the detection zone.

In the detection zone a first vehicle detector 100 includes a conductive tape 102 extending all across the lane, and a pair of conductive tapes 104 and 106 each extending along a half of tape 102. The tapes 104 and 106 are spaced from tape 102 by a spaced series of rubber bands disposed crosswise between the tapes, the whole enclosed in a protective rubber sheath. One half-length tape 104 is connected to the ground of the system, the other end to a grid. Tape 100a is the second one in the path of the traffic, in all respects like tape 100.

Tape 100 triggers pulse generator 108 to emit a starting pulse, starting a measurement interval of elapsed time measurement unit 110. Pulse generator 108a in all respects like pulse generator 108 produces a stopping pulse for the unit 110. A "speeder" pulse is emitted by unit 110 if and only if the pulse from unit 108a occurs within a preset interval representing excessive speed when the separation of the tapes is taken into account.

Pulse generator 108 includes a small thyratron 112 whose grid has blocking negative bias applied thereto via resistor 114. A condenser 116 charges to the power-supply voltage, in steady-state conditions, via very large resistance element 118. A limiting resistor 120 is connected between condenser 116 and the thyratron anode, and a load resistor 122 is connected between the thyratron cathode and ground, the negative power supply terminal.

When tape 102 completes a series circuit between ground and the thyratron grid (by pressure against tapes 104 and 106) the thyratron bias is momentarily cut off and the thyratron fires. This discharges condenser 116 through load resistor 122, producing an output pulse. The time constant of condenser 116 and resistor 118 is short compared to the frequency of vehicle wheels reaching tape 100, so that a new pulse is emitted for each pair of wheels. Tape 100a causes stop pulses to be emitted from generator 108a that is the exact duplicate of unit 108.

A limited-time storage or delay unit 123 is also energized with pulses produced by pressure of pairs of wheels on the respective tapes. This includes condensers 124 that are normally charged to the bias voltage of the thyratrons, but impress positive pulses on the grids of the tubes 128 connected thereto when the tapes are pressed by vehicle wheels, these tubes having grid-return resistors 126. Common cathode resistor 130 is quite large in value, so as to cause tubes 128 to operate like an infinite-impedance detector. The cathode voltage is comparatively low in the absence of pulses, but the cathode potential rises momentarily to the peak value of the pulses at the grids of tubes 128, decaying thereafter in dependence on the remainder of the components in the cathode circuit.

Between cathode and ground or across resistor 130 there is a series circuit including crystal rectifier 132 and low-loss condenser 134. The condenser is quickly charged to the peak voltages of the cathode, but the charge decays relatively slowly. The significance of this circuit and its function will be made clear below. It is important to observe, however, that no matter whether the condenser is completely discharged to its steady-state condition or whether the condenser is only slightly decayed after being charged to a peak, the condenser nevertheless starts a new decay-cycle in response to each impulse from either tape.

A special form of storage stage 136 is controlled by the speed detection unit 110 and by the delay unit 123, such that delay unit 123 has no effect unless the stage is first triggered by elapsed time or speed detector; and after such triggering, unit 123 takes control though the signal from unit 110 has passed.

Stage 136 includes a pair of triodes 138, 140 arranged in a cathode phase-inverter, with the grid of triode 138 biased by adjustable voltage divider 139, 141 to be definitely higher than the resting potential of the cathodes of tubes 128. This causes bias to be developed across common cathode resistor 142, and triode 140 is driven to cut-off. The grid of this triode has a return circuit to ground, for application of this cut-off bias, via the back resistance of rectifier 132 and resistor 130.

A thyratron 144 is connected with its cathode at the anode of triode 140 and with its anode connected via load resistor 146 to the positive direct-current supply. The grid of this thyratron has a high negative bias applied via resistor 148, and is connected suitably to detector 110, as via control contacts or a blocking condenser.

The operation of stage 136 is as follows. Application of pulses to the grid of tube 140 is ineffectual even where they exceed the cut-off bias developed in cathode resistor 142 by triode 138. Such pulses actually are applied from the moment a vehicle hits the first tape until the resulting charge on condenser 134 produced by that pulse and subsequent pulses decays. Notably, the potential at the grid of triode 140 conditions that triode for conduction as soon as thyratron 144 is fired. This occurs when unit 110 indicates a vehicle has passed the tapes 100 and 100a in less than the minimum permissible time. The unit 110 short-circuits the bias or emits a positive pulse for the grid of thyratron 144. Both thyratron 144 and triode 140 conduct, and they remain conducting until the pulses from the tapes stop coming for a time interval long enough to allow the charge on condenser 134 to drop sufficiently below the grid potential of triode 138 to cut off tube 140. Extreme negative potential on the thyratron grid is actually restored; but this is of no effect on thyratron 144 until tube 140 is blocked.

The time constant of circuit 130—132—134 and the peak voltage to which it is charged are adjusted in relation to the grid voltage provided by voltage divider 139—141 so that a certain time interval elapses before stage 140 becomes biased off. This time interval is equal to the time it takes a vehicle to travel at the excess-speed threshold of unit 110 a distance equal to the greatest spacing between axles of vehicles whose rears are to be photographed, this spacing being reduced by the separation between the tapes 100 and 100a. Thus it may be assumed that 20 feet is the greatest axle separation to be taken into account. If the tapes are three feet apart, the distance to be considered for delay-unit adjustment is seventeen feet. If sixty miles per hour is set as the minimum speed at which the equipment is to operate the camera, the delay will be about 0.2 second. After the last pair of wheels of a speeding vehicle has passed the last tape and 0.2 second has elapsed, the rear of the vehicle will be in the field of the camera. At speeds greater than the minimum rate considered excessive, the vehicle-rear would travel somewhat further from the camera than the minimum-rate speeders; but this difference is not serious, for the camera has a substantial depth of focus, and is aimed along the path of departing traffic. Moreover, the actual speed as measured by unit 110 can be used to adjust the potential at the grid of triode 138 and thereby adjust the delay time. Technically, high-speed cars cause condensers 124 to discharge and recharge at higher repetition rates than lower-speed cars, and this has the effect of reducing the peak value of voltage applied to tubes 128 and developed across condenser 134; and in consequence the described circuit produces a delay time that is an inverse function of the vehicle speed. This is because the time constant of resistors 114 and 126 with condenser 124 is of the same order of magnitude as the period of wheel-pulses from the tapes as produced by speeding cars.

Reverting to the operation of stage 136, it is seen that at the outset there is no voltage across resistor 146. When tubes 140 and 144 become conductive, a voltage is developed across resistor 146 that yields a negative-pulse output via an output condenser. When tubes 140 and 144 cease being conductive (at the end of the last delay interval of any series of 2, 3 or greater number of wheel-pairs of a speeding vehicle) the drop across resistor 146 disappears, and a positive-pulse output is developed. As will be seen, the steady-state condition of no voltage across resistor 146 is of no effect, nor is the negative change; but the change from a drop across resistor 146 to no voltage drop is the condition that produces camera operation.

The camera-actuating positive pulse developed as just described is transmitted via coupling condenser 150 to tube 152. This tube is normally biased off by tube 154, because of grid voltage from voltage divider 158—160. Current from tube 154 develops bias voltage in common cathode resistor 162 that is applied to the grid of tube 152 via resistor 156. The positive pulse on the grid of tube 152 renders that tube momentarily conductive, to energize camera-operating relay 164. This actuates camera 166 that is aimed at a part of the road where the rear of a speeding vehicle will be passing.

Figure 4 shows a further embodiment of various features of the invention that appear in the previously described figures, and certain additional features are included in this figure. Like Figure 3, Figure 4 includes wheel-actuated contacts, a wheel-actuated delay circuit for framing the vehicle-rear in the field of the camera, and a speed detector, all in control relation to the camera. Figure 4 adds vehicle detectors effective in multiple lanes, omitted from Figure 3. This feature is found in Figure 1, but it is improved in Figure 4. Certain delay times involved in relay operation as in Figure 1 are avoided in the electronic circuit of Figure 4. In this figure, there are two wheel-actuated vehicle detectors 200 and 202 located along the traffic path in the order named. Detector 200 includes three segmented conductors 200a, 200b and 200c, each of which is suitably arranged to make contact with a bridging conductor 200d. Similarly, detector 202 includes segmental contacts 202a, 202b, and 202c, and a bridging conductor 202d. A pair of first detector tetrodes 204 and 206 have their grids normally connected via resistors 204a and 206a to ground, and these grids are connected via condensers 204b and 206b and resistors 204c and 206c to a source of negative potential. Second detector tetrodes 208 and 210 similarly have grids connected to ground via resistors 208a and 210a, and these grids reach a negative supply potential via condensers 208b and 210b connected in series with resistors 208c and 210c, respectively. Segmental detectors 200a and 200c reach the respective junctions 204b—204c and 206b—206c, while segmental contacts 202a and 202c reach the respective junctions 208b—208c and 210b—210c. When a vehicle travels along the upper lane in the drawing, as illustrated by the broken-line arrow 211, it connects contact 200a to contact 200b. Because the latter contact is grounded the voltage to which condenser 206b is charged is impressed across the grid resistor 206a. The grid side of that resistor is driven positive in relation to ground, and the tube 206 becomes momentarily heavily conductive.

A similar result occurs when contacts 200b and 200c are connected together by a vehicle in the lower one of the two lanes represented in the drawing, driving tube 204 heavily conductive. Likewise, actuation of the detector-contact pair 202a—202b renders tube 210 heavily conductive, and actuation of detector-contact pair 202b—202c renders tube 208 heavily conductive momentarily. The segmental contacts may be replaced with segmental pneumatic hoses and pressure-actuated switches, although this would be a relatively awkward practice. Furthermore, in broad concept, other detectors may be used in substitution for the wheel-actuated detectors illustrated. Thus, where a single photocell is used to detect a vehicle by being focused from above on a bright spot on the roadway, and an impulse is produced by a vehicle passing over the spot, an improved detector results when two side-by-side spots on the roadway are utilized to actuate two photocell controlled circuits arranged so that both must be operated if there is to be a control effect. This has the advantage over a single photocell in that the spurious effect of a bird entering the detection beam of a single photocell is avoided where two are used. Likewise, where three photocells are employed in place of the three segmental contacts illustrated, the apparatus can be rendered effective to detect speeding selectively in multiple lanes, as described in connection with the tapes. The latter are more flexible to install and more certain in use.

Contacts 200a—200b are serially connected, as illustrated, for joint response to a vehicle in one lane, and contacts 200b—200c jointly produce response to a vehicle in a second lane. It is manifest that entirely separate contacts can be used in independent circuits, with relays or like devices arranged (as with series-connectable contacts) to respond selectively to vehicles in three or more lanes.

It is evident that various forms and arrangements of vehicle detectors may be substituted for the arrangement shown in achieving certain broad objects of the invention. It should be observed, however, that the function of detecting the last wheel-produced pulse of a two-axle vehicle or a three- or four-axle vehicle so as to frame the rear of a vehicle in the field of the camera in the manner specifically described requires a form of detector that responds to the wheels of the vehicle rather than to the vehicle as a unit.

Tubes 204 and 206 produce "start" pulses for the elapsed-time or speed detector 212, by virtue of a sudden voltage developed across the respective plate load resistors 204d and 206d and transmitted via coupling condensers 204e and 206e.

Tubes 204 and 206 are effective for the additional purpose of developing control of a duration long enough for a speeding vehicle to enter the detection zone as represented by the first detector and until the vehicle (if a speeder) reaches the camera field. This is used for two purposes in the apparatus of Figure 4, as will be seen, both for selectively disabling the detectors in the other lane of the two traffic lanes shown and for suppressing camera actuation until the right moment. Cathode resistors 204f and 206f of relatively large values develop pulse voltages which are stored in condensers 204g and 206g, reaching the condensers via series rectifiers 204h and 206h, respectively. These rectifiers allow the condensers to charge to the peak values of the pulses, and they then allow the condenser charge to leak off through the back resistances of the rectifiers. Shunt resistors may be used, if desired, to adjust the time constant of the circuit. Resistors 204f and 206f enter into this time constant, but are small relative to the rectifier back resistances. The condensers stop discharging and quickly re-charge with each new pulse, so that the operative time of discharge is measured from the last wheel of a vehicle. This is readily computed, by considering the greatest spacing between any two wheels of a vehicle that is to be photographed, considering the minimum speed for which the system is set. Thus, if twenty feet is the greatest separation of wheels in a trailer truck, and if the speed setting is seventy miles per hour, the delay time is 1/5 second, to a close approximation. Wheels reaching detector 200 within this interval will re-start the timing. The condenser will discharge to a critical control level in 1/5 second. The interval is 2/5 second at 35-mile-per-hour control settings. The level is easily adjusted, as will be seen, to meet this delay-time-requirement.

The grid of a cathode phase-inverter control tube is connected to each delay condenser, the control section 214a of tube 214 being connected to condenser 206g and the control section 216a of tube 216 being connected to condenser 204g. The bias section 214b of tube 214 is energized by a voltage divider 218, and the bias section 216b of tube 216 is energized by voltage divider 220. Both control sections are normally cut off by the current of the bias sections flowing in cathode resistors 214c and 216c, respectively. Control section 214a has its anode connected to the resistor 204i that energizes the screen of tube 204. This drops the screen voltage below its effective range, so that tube 204 becomes inoperative during the timing interval of condenser 206g. Conversely tube 206 is disabled during the timing interval of condenser 204g. Tube 208 which responds to the second detector in the lane that controls tube 204 is disabled with tube 204, and tube 210 is disabled when tube 206 is disabled. Suitable isolation between the screens of tubes 204 and 208 is provided, as is isolation for the screens of tubes 206 and 210.

The effect of the foregoing is to render the detectors in each lane idle during the time that a speeding vehicle is traversing the other lane. In any event, only the detectors of one lane are effective during any measurement operation.

For the purpose of delaying camera action until the proper time, tubes 222 and 224 are provided, each having a control section and a bias section. The bias sections 222b and 224b, having their grids energized by voltage dividers 218 and 220 as shown, are normally conductive whereas the control sections 222a and 224a are normally cut off. The anode supply of tubes 222a and 224a extend respectively through lamps 226 and 228, to the holding contacts 230a of relay 230, and to a positive potential point. Contacts 230a are normally open, so lamps 226 and 228 are normally out, and control sections 222a and 224a are normally deenergized. Lamps 226 and 228 are in the data recording chamber of a standard camera having such chamber. Relay 230 is energized when, and only when, speed detector 212 detects a speeder. One light 226 or the other 228 identifies the traffic lane that is being monitored in the particular speed-detection operation. That light goes on when the relay is energized since at that time one or the other of condensers 204g or 206g is in condition to drive a control section 222a or 222b conductive. The light stays on, and is registered on the film, during the delay time interval.

Lamp 226 or 228 that was "on" goes "off" and the disabling control produced by tube section 214a or 216a ends, when the bias of divider 218 or 220 exceeds the voltage to which condenser 204g or 206g has decayed. The voltage of these voltage dividers may be adjusted to give a sharp, regularly repeated delay-time after the peak charging of the condenser 204g or 206g. The peak charge may be 100 volts, for example, and the bias at the voltage dividers may be 25 volts. The steady-state voltage of these condensers is 12 volts, for example, between vehicle-detection cycles.

Relay 230 has a pair of contacts 230b that are normally closed. These contacts connect resistor 232 across a direct current potential source, and they connect condenser 234 and camera tripper 236 in series across the direct current supply. Tripper 236 may be simply a camera-tripping solenoid, or it may be an amplifier that in turn actuates the camera tripper, depending on whether a small or a large condenser 234 is used. In the steady state, tripper 236 is idle and condenser 234 is fully charged.

When relay 230 opens contacts 230b, condenser 234 discharges more or less completely through resistor 232. When the holding interval of relay 230 ends, indicating that a speeding vehicle has its rear in the field of the camera, contacts 230b close. Condenser 234 draws charging current through these contacts and actuates the camera. The image of both lanes is recorded, as illustrated in Figure 5, together with an indication of which lane was in control. This indication is produced by the light 226 or 228.

At the time relay 230 drops out, tubes 214 and 216 also resume their normal state, and all sections of the tapes 200 and 202 are in condition to function. If it should happen that, at that moment, a vehicle has one pair of wheels close to tape 202, this is of little concern. Tapes 200 are the only ones that initiate a cycle. The first pair of segments 200a—200b or 200b—200c take control of the equipment for the particular lane first detected by tape 200.

Elapsed-time detector 212 is controlled by the "start" and "stop" impulses from tubes 204 or 206 and 208 or 210, respectively; and this control determines whether camera control relay 230 will operate.

Detector 212 in the form shown includes a presettable counter 238 that is of any suitable design, operating gate 240 in one sense from the start of a counting sequence until a predetermined number is reached, and operating in the other sense thereafter. The count is of pulses from a stable source of oscillations 242, through a start-stop gate 244. Start pulses reach gate 244 from the "start" tape 200 and one of tubes 204 or 206, through "flip-flop" 246 which transmits a first "start" pulse and is thereafter immune to further pulses until reset. "Stop" pulses are applied both to start-stop gate 244 and to operating gate 240. If the latter is still within the limit for which counter 238 is set at the time the next following "stop" pulse is applied, then and only then will an output signal reach tube 248 that operates relay 230. A "stop" pulse reaching unit 240 outside the set count limit of counter 238 will not be transmitted to unit 248 but instead will be applied (in suitably modified form) to reset unit 250. The resetting effected in response to a stop pulse at the end of a long timing interval restores flip-flop 246 and counter 238 to their starting condition. Similar resetting is effected after a short, camera-actuating cycle only at the end of the camera operation, by a connection from unit 236 to reset unit 250. In this way, lights in the camera data recording chamber, energized by counter 238 and which hold this count reached at the time of the "stop" pulse, record a speed indication on the film during the delay time provided by condensers 204g, 206g and the associated circuit. A suitable translating matrix may be used to convert the count into actual speed values, if desired.

A few further remarks concerning relay tube 248 are in order. This tube has a control section 248a that is normally cut off by bias section 248b that operates with positive potential on its grid from voltage divider 252. Both a negative-going half-cycle and a positive-going half-cycle may reach section 248a. Tube section 248a responds only to the latter, to energize relay 230. Relay 230 is under joint control of the elapsed-time detector or measuring unit 212 and the camera-suppressing delay circuit. The latter operates directly from the tapes; but it is effective only after the proper result is transmitted by the elapsed-time measuring unit 212.

Where the delay system in the three embodiments described above are used, there is obvious advantage to utilizing the same vehicle-detector elements in controlling the speed detector which, in that event, conveniently takes the form of an elapsed-time metering arrangement. However, if desired, separate vehicle detectors may be used for the delay systems and for the elapsed-time metering device; and, indeed, the delay system can be used to advantage with other speed metering devices such as the doppler radar speed detector for example.

Certain significant variations of the illustrative embodiments have been discussed above as the description developed. A number of other variations and improvements will occur to those skilled in the art, and varied applications of the novel features will also be apparent. Therefore the invention should be accorded broad con-

What I claim is:

1. In combination, a pair of wheel-actuated vehicle detectors spaced apart along a traffic lane by a measured distance and adapted to produce a series of signals upon actuation thereof by successive wheels of vehicles traveling along the traffic lane, an elapsed-time device connected to said detectors, said device being of a type to be differently responsive to vehicles traversing the distance separating the detectors in a shorter or a longer time than a set time interval, a camera directed at a point in the traffic lane beyond the vehicle detectors, and a delay timer operatively connected to at least one of said wheel-actuated vehicle detectors for starting and re-starting the operation of the delay timer, said delay timer additionally including an element whose condition progressively changes from a starting condition to a critical condition after elapse of a delay time interval during which no signals from the wheel-actuated vehicle detectors are impressed on the delay timer, the delay timer thus being restarted by successive signals occurring within the delay time interval and the total delay time following starting of the delay timer until said critical condition is attained being thereby extended, and output control means connected to said element for sensing the condition thereof, said output control means and said elapsed-time device being interconnected with each other and with said camera for actuating the camera at a time interval after the last wheel of a closely adjacent sequence of wheels has left said one detector but only in the event of response of said elapsed-time device to a vehicle traveling the measured distance in a shorter time than the set interval.

2. In combination, a wheel-responsive detector in a traffic lane, a camera directed at a region in said lane beyond said detector, a delay timer effective to actuate said camera a predetermined time after initiation of the delay time, said delay timer including means generating a signal upon the elapse of said predetermined time following a starting signal to the timer in the absence of any further signal thereto, and a connection from said delay timer to said detector effective to start and to re-start the delay timer in response to each of a succession of wheels reaching the detector during any delay time interval or re-started delay time interval shorter than said predetermined time, said signal generating means being connected in control relation to the camera for photographing the rear ends of vehicles whose wheels pass the detector successively at intervals shorter than said predetermined time, irrespective of the number of wheels of the vehicle.

3. In combination, a vehicle speed detector differently responsive to vehicles traveling above and below a set speed, a wheel detector in a traffic lane monitored by said speed detector, a camera directed at a point in the traffic lane beyond the wheel detector, and a delay timer under control of said speed detector and effective to actuate said camera at a time interval after a wheel has passed said detector, said delay timer including output means signalling the elapse of a certain delay time following a starting signal to the timer in the absence of any further signal thereto and said timer having a re-starting connection to said wheel detector whereby camera actuation is delayed by a sequence of wheels reaching the wheel detector within less than the delay time and until the full delay time interval has elapsed after the last wheel of the sequence has passed.

4. Apparatus in accordance with claim 3, wherein the speed detector and the delay timer are related so that the delay timer actuates said camera at a distance beyond the detector which is substantially equal to the greatest axle separation of the vehicles to be photographed traveling at the minimum speed for which the speed detector is to control camera actuation.

5. In combination, a vehicle speed detector, a wheel detector, a delay timer having a re-starting connection to said wheel detector, said connection being effective to re-start the timer in response to each wheel traversing the detector, said timer including output control means signalling the elapse of a set time following any signal from said wheel detector not followed by another such signal during said set time, and a camera connected to and controlled by both said delay timer and said speed detector.

6. A traffic monitoring system, including a vehicle speed detector and a camera controlled thereby to photograph speeding vehicles in a predetermined traffic lane, said system including a pair of vehicle detectors disposed to be effective at aligned positions across said lane, said vehicle detectors both being connected to the speed detector in control thereof and said vehicle detectors being connected to each other as a coincidence detection circuit to effect control of the speed detector only when simultaneously actuated.

7. A traffic monitoring system, including a first pair of vehicle detectors disposed in aligned positions across a traffic lane and a second pair of vehicle detectors disposed in aligned positions across said lane, said pairs of detectors being separated along said lane by a distance that is of the same order of magnitude as the separation along the lane of the wheels of the vehicles to be monitored, the detectors of each pair responding simultaneously to laterally separated parts of a vehicle in the lane and the pairs of detectors responding in quick succession to a vehicle speeding along the lane, and a speed detector controlled by said pairs of vehicle detectors, said vehicle detectors thereby controlling the speed detector to produce an unambiguous response to the vehicle that caused operation of the speed detector.

8. Apparatus in accordance with claim 7 wherein said vehicle detectors are pressure-responsive elements and wherein said pairs of detectors are separated along the traffic lane by an accurately established distance of about three feet.

9. A vehicle monitoring system, including a camera disposed to photograph vehicles in a plural-lane road, a speed detector connected in control relation to said camera, and vehicle responsive detectors disposed in the plural-lane road and connected in control relation to said speed detector, said vehicle detectors including first and second devices separated along each lane of plural lanes of said road, and control connections from each of said first vehicle detectors operable in response to detection of a vehicle in one lane to disable the second one of the vehicle detectors in another lane temporarily.

10. A vehicle monitoring system, including a camera directed at a road and operative to photograph vehicles therein, a speed detector controlling said camera, and vehicle responsive detectors disposed in the road and connected in control relation to said speed detector, said vehicle detectors including first and second devices longitudinally spaced along each lane of multiple lanes of said road, disabling means controlled by the first device in each lane effective to suppress control of the speed detector by the second device in another of said lanes, and vehicle responsive means including indicating means in the camera and controlled by said disabling means to photographically record selective indicia indicating which pair of longitudinally spaced vehicle detectors actually controlled the speed detector to cause camera operation and thus was responsible for each photograph.

11. A vehicle monitoring system, including a speed detector, a pair of sets of vehicle detectors controlling said speed detector, each set being effective at a series of positions across a road in respective traffic lanes of the road and the sets being spaced apart a measured distance along the road, each set including vehicle detecting elements effective only in simultaneously actuated pairs to control the speed detector, and control connections responsive to a simultaneously actuated pair of vehicle detecting elements in one lane for temporarily disabling the paired vehicle detecting elements of the second set except for the vehicle detecting elements of the lane of the first-actuated pair of vehicle detectors.

12. A vehicle monitoring system, including a speed detector, a pair of sets of vehicle detectors controlling said speed detector, each set being effective at a series of positions across a road in respective traffic lanes of the road and the sets being spaced apart a measured distance along the road, each set including vehicle detecting elements effective only in simultaneously actuated pairs to control the speed detector, control connections responsive to a simultaneously actuated pair of detecting elements in one lane for temporarily disabling the paired vehicle detecting elements of the second set except for the vehicle detecting elements of the second set in the lane of the first-actuated pair of vehicle detecting elements, a camera controlled by said speed detector to photograph vehicles traveling in excess of a set speed, and means controlled by said disabling control connections to produce in each photograph a record of the operative vehicle detecting elements that controlled the speed detector and the ensuing camera operation.

13. A vehicle monitoring system, including a speed detector, at pair of sets of vehicle detectors controlling said speed detector, each set being effective at a series of positions across a road in respective traffic lanes and the sets being spaced apart a measured distance along the road, each set including elements effective only in simultaneously actuated pairs to control the speed detector, control connections responsive to a simultaneously actuated pair of vehicle detecting elements in one lane for temporarily disabling the paired vehicle detecting elements of the second set except for the vehicle detecting elements of the lane of the first-actuated pair of vehicle detecting elements, and means responsive to each actuation of a pair of vehicle detecting elements that is not disabled for maintaining the disabled condition of the other vehicle detecting elements for a predetermined period of time and for re-starting the disabling period in response to each renewed actuation of a pair of vehicle detecting elements occurring within an unelapsed previously started period.

14. Apparatus in accordance with claim 13, including a camera controlled by the speed detector and disabled by said control connections until elapse of said predetermined period after the rear of the detected vehicle passes the detector region.

15. Vehicle monitoring apparatus, including wheel detecting means disposed in a traffic lane, said wheel detecting means being adapted to provide a series of signals in accordance with a succession of wheels traversing the detecting means, a delay timer operatively connected to and started by said wheel detecting means, and utilization means connected to and controlled by said delay timer, said delay timer including a condenser, a direct-current source, resistive means connected to the condenser and arranged to control the change of charge on the condenser, and switching means establishing a limiting value of charge for starting and restarting of the timing operation, said switching means being connected to and controlled by said wheel detecting means and being responsive to the signals thereof, and output means connected to said condenser and responsive to a critical value of the charge thereof, said output means being connected to said utilization means and in control thereof.

16. Apparatus in accordance with claim 15, wherein said utilization means includes a speed detector and a camera controlled thereby so that vehicles traveling at various speeds will have their rears approximately in the same position for automatic, consistent photographing of the vehicle rears provided that the wheels of any such vehicle pass said wheel detecting means in succession at time-intervals less than that required for the charge of said condenser to change from said limiting value to said critical value.

17. A traffic monitoring system, including a camera, a speed detector, and vehicle-wheel responsive delay means, said delay means being of a type to be re-started upon renewed stimulation during an unelapsed timing interval, said delay means including electrical means operative to produce an output control signal solely in response to internal change of condition at the end of a timing interval following response to the last wheel of a vehicle to be photographed, a control connection from said electrical means to said camera to actuate the camera at the end of the delay time, and enabling means rendered effective by said speed detector to render said control connection operative.

18. Apparatus in accordance with claim 17, including a device controlled by said speed detector to complete a holding circuit for said delay device.

19. A vehicle monitoring system, including a speed detector, and vehicle responsive detectors disposed in a plural-lane road and connected in control relation to said speed detector, said vehicle detectors including first and second devices separated along each lane of the plural lanes of said road, and control connecting means from each of said first vehicle detectors operable in response to detection of a vehicle in one lane to disable the second one of said vehicle detectors in another lane of the road.

20. A vehicle monitoring system, including a camera directed at a multiple lane road and operative to photograph vehicles therein, a speed detector controlling said camera, and vehicle responsive detectors disposed in the road and connected in control relation to said speed detector, said vehicle detectors including a pair of devices longitudinally spaced along each lane of multiple lanes of said road, and vehicle responsive means including indicating means controlled by said devices and contained in the camera for photographically recording selective indicia indicating which pair of longitudinally spaced vehicle detectors was in control of the speed detector to cause operation of the camera.

21. A vehicle monitoring system, including a camera directed at a multiple lane road and operative to photograph vehicles therein, camera control means, and vehicle responsive detectors disposed in control relation to said camera control means, said vehicle detectors including a pair of devices longitudinally spaced along each lane of multiple lanes of said road, and vehicle responsive means including indicating means controlled by said devices and contained in the camera for photographically recording selective indicia indicating which pair of longitudinally spaced vehicle detectors was in control of the speed detector to cause operation of the camera.

22. A vehicle monitoring system, including a camera directed at a multiple lane road and operative to photograph vehicles therein, vehicle detectors in the lanes of said road, respectively, having control connections to the camera for operation thereof, and indicators in said camera and controlled by said detectors to record an indication of the detector of which of the lanes caused each camera operation of the camera.

23. A traffic monitoring system, including vehicle-wheel-responsive means, a utilization device controlled by said wheel-responsive means, and a delay device including an electrical circuit having a time constant effective to generate an output control signal after elapse of a delay period following a starting impulse but only in the absence of an effective concurrent signal to the delay device, said delay device having input control connection from and being adapted to be repetitively restarted by said means before elapse of said period in response to succeeding close wheels of a vehicle for controlling said utilization device following the last wheel of a closely spaced series of wheels only after elapse of said time interval without restarting occurring during such interval.

24. Vehicle monitoring apparatus, including wheel detecting means disposed in a traffic lane, said wheel detecting means being adapted to provide a series of signals in accordance with a succession of wheels traversing the detecting means, a delay timer operatively connected to and activated by said wheel detecting means, and utilization means connected to and controlled by said delay timer, said delay timer having input control connecting means from said wheel detecting means effective to start the delay timer in operation and to restart the delay timer during a timing operation thereof, said delay timer having means that varies in condition progressively as a function of elapsed time following its start or restart of operation, and means connected to said condition-varying means and arranged to respond to attainment of a critical condition thereof indicative of the elapse of a predetermined time interval following the last of any series of signals from said wheel detection means succeeding each other within less than said predetermined time interval, said last-named means being connected in control relation to said utilization means and arranged to control the operation thereof in dependence on its response to the critical condition aforesaid.

25. Vehicle monitoring apparatus in accordance with claim 24, further including at least one additional wheel detector in a traffic lane adjoining said first-mentioned traffic lane, and additional means connected to and normally responsive to said additional wheel detector, and wherein said utilization means constitutes a disabling device for said additional means for suppressing the response thereof to said additional wheel detector from the time of starting of the delay timer and until said critical condition is attained.

26. Vehicle monitoring apparatus in accordance with claim 24, further including additional wheel detecting means in a traffic lane adjoining said first-mentioned traffic lane, two signalling devices respectively identified with said two lanes, and common means to operate the signalling devices, said utilization means constituting a selective control for suppressing operation of the signalling device corresponding to said adjoining traffic lane.

27. Vehicle monitoring apparatus in accordance with claim 24, including a camera directed at said traffic lane and actuating means therefor and wherein said utilization means constitutes a control operatively connected to said camera actuating means.

28. A vehicle monitoring system in accordance with claim 19, including means controlled by said speed detector and by said last-named means in claim 19 for making a recording evidencing the lane in which a speeding vehicle was detected.

References Cited in the file of this patent
UNITED STATES PATENTS

| | | |
|---|---|---|
| 2,091,357 | Goldsmith | Aug. 31, 1937 |
| 2,163,419 | Warren | June 20, 1939 |
| 2,201,145 | Barker | May 21, 1940 |
| 2,325,435 | Sykora | July 27, 1943 |
| 2,330,872 | Diebold | Oct. 5, 1943 |
| 2,347,194 | Holliday | Apr. 25, 1944 |
| 2,619,402 | McCutcheon | Nov. 25, 1952 |
| 2,708,148 | Clark | May 10, 1955 |